UNITED STATES PATENT OFFICE.

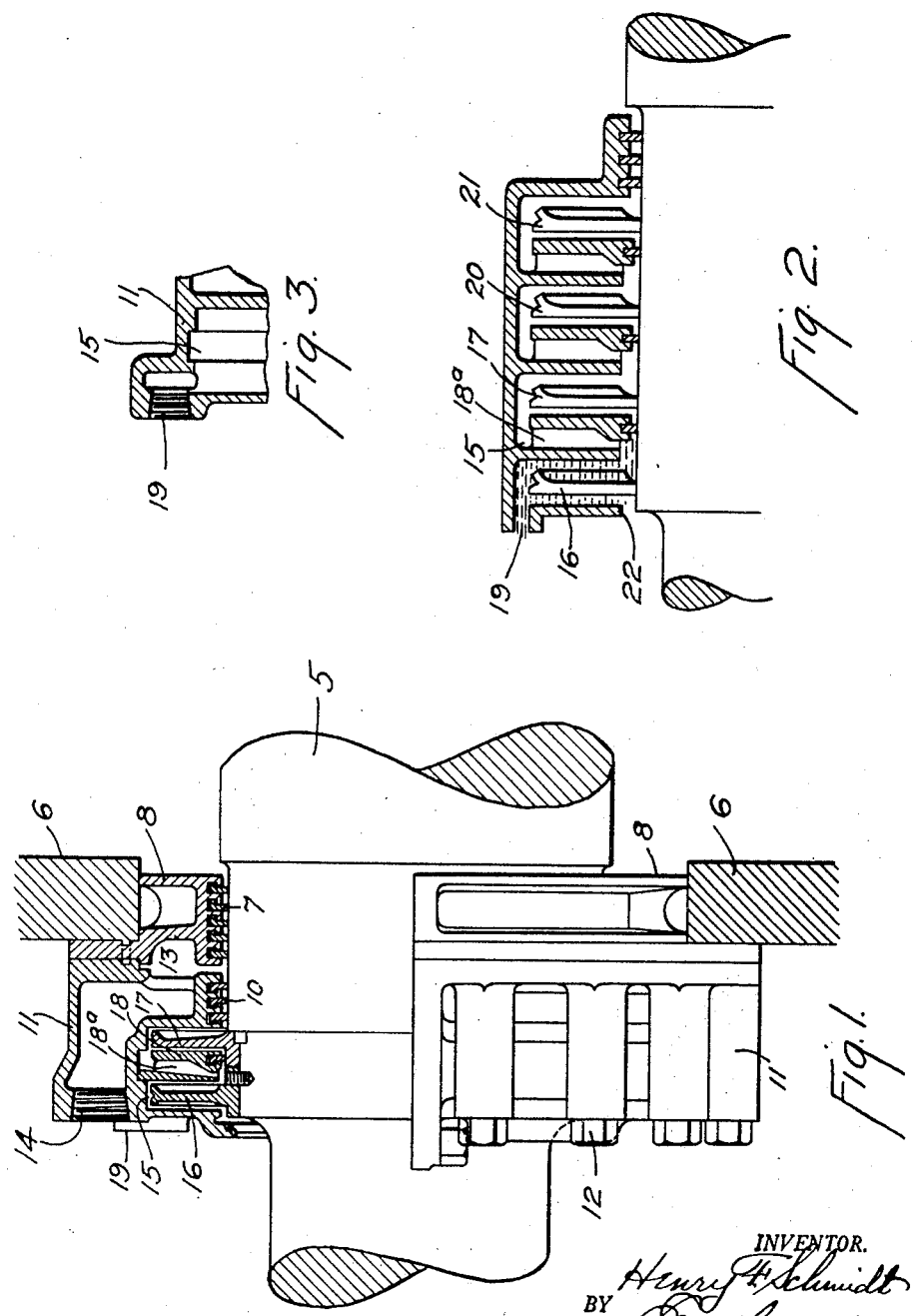
H. F. SCHMIDT.
PACKING.
APPLICATION FILED FEB. 23, 1917.
1,329,548.
Patented Feb. 3, 1920.

HENRY F. SCHMIDT, OF PITTSBURGH, PENNSYLVANIA, ASSIGNOR TO WESTINGHOUSE ELECTRIC & MANUFACTURING COMPANY, A CORPORATION OF PENNSYLVANIA.

PACKING.

1,329,548.  Specification of Letters Patent.  Patented Feb. 3, 1920.

Application filed February 23, 1917. Serial No. 150,403.

*To all whom it may concern:*

Be it known that I, HENRY F. SCHMIDT, a citizen of the United States, and a resident of Pittsburgh, in the county of Allegheny and State of Pennsylvania, have made a new and useful Invention in Packing, of which the following is a specification.

This invention relates to packings and has for an object to produce a new and improved packing for sealing the joint between a rotating member, such as a turbine shaft, and a stationary member, such as a turbine casing.

A further object is to produce a new and improved liquid seal which is especially adapted for packing the joint between the shaft and the casing of a turbo machine, such as a rotary pump or a turbine.

A further object is to produce a device for maintaining a liquid seal between a rotatable member and a stationary member over a wide range of speeds and under different pressure conditions.

A further object is to produce a packing which includes a steam sealing device for sealing the joint between a rotatable member and a stationary member when the rotatable member is at rest, or rotating at a low speed, and a liquid sealing device for sealing the joint when the rotatable member is in operation, at either relatively low, intermediate or high speed.

A further object is to produce a packing for turbo machines and pumps which may be opened for inspection or cleaning, or may be removed from the machine to which it is applied without necessitating removing or disturbing any other part of the machine.

These and other objects, which will be made apparent throughout the further description, are attained by means of a packing embodying the features herein described and illustrated in the single sheet drawing accompanying and forming a part hereof.

Figure 1 is a view partially in side elevation and partially in section of a packing gland embodying my invention and shown in connection with a fragmental section of a turbine casing and a fragmental elevation of a turbine shaft.

Fig. 2 is a fragmental sectional view of a modified form of gland embodying my invention.

Fig. 3 is a vertical section through a fragment of the gland casing illustrated in Fig. 1.

Centrifugal liquid sealing devices or packings are old and familiar to those skilled in the art. In connection with turbines, for example, they commonly include a runner or impeller attached to the turbine shaft and adapted to operate in a closed annular chamber attached to or forming a part of the turbine casing. In operation the centrifugal action of the rotating impeller forces the water supplied to the annular chamber against the outer wall of the chamber with considerable force. The pressure of the water in the water annulus prevents air from leaking into the turbine around the impeller and then along the shaft under high vacuum conditions, or steam from leaking out of the turbine under atmospheric exhaust or back pressure conditions. Obviously, when the shaft, and hence the impeller, is not in operation there is no centrifugal action and the seal will be broken by the falling away of the sealing liquid. Similarly, at low speeds, the centrifugal force is not sufficient to maintain the liquid annulus in place or, if so, the pressure of the water in the ring is not sufficient to counterbalance the pressure of the air or steam which is trying to force its way around the impeller and along the shaft.

In my invention I provide means such that when the speed of rotation of the rotating member decreases to such an extent that one runner is incapable of maintaining the seal, one or more additional runners will be brought into operation and will coöperate with the runner or runners previously in operation in such a way as to maintain the seal. In the illustrated embodiment of my invention I have also provided a steam packing for sealing the joint when the rotatable shaft is at rest.

Referring to the drawing, I have illustrated in fragmental elevation, a turbine shaft 5 at a point where it passes through the turbine casing 6. To prevent the leakage of steam or air past this point I have shown a packing including both a steam sealed packing section and a liquid, or water, sealed packing section. The steam sealed packing section is provided with a number of segmental rings 7, which are pressed against the shaft 5 or held in close proximity to it by springs or other means not shown. As shown, these rings 7 are mounted in the inner section 8 of a split casing, which is secured to the turbine casing 6 in any suitable manner. Outside of the group of rings 7, along the shaft 5, I have shown a second group of similar rings 10, which are held in similar relation to the shaft 5 by means of the outer section 11 of the split casing. The outer casing section 11 is bolted directly to the inner casing section 8 by means of bolts 12, which may be employed in securing the casing section 8 in place. The casing section 11 is formed so as to leave an annular chamber 13 between the two groups of rings 7 and 10. A port 14 communicates with the annular chamber 13, and is used as a steam inlet when the turbine is operated under vacuum, and for a leak off when the turbine is operated with back pressure or atmospheric exhaust.

I have also shown the outer casing section 11 as forming an annular chamber 15, in which two impellers or runners 16 and 17 operate. The impellers are, of course, mounted on the shaft 5 of the turbine. Direct communication between the impellers 16 and 17 is prevented by a partition wall 18, although a communicating passage 18ª in this partition is adapted to conduct liquid from the outer periphery of the impeller 17 to the inner portion of the impeller 16, or vice versa. An inlet port 19 is shown through which a liquid, such as water, may be admitted to the chamber 15.

The operation of the steam sealed section is as follows: Under vacuum operating conditions the atmospheric pressure tends to force air into the turbine casing 6 along the shaft 5. Steam is supplied to the annular chamber 13 between the two groups of segmental rings 7 and 10 at a pressure somewhat higher than that of the atmosphere. This steam works past the rings along the shaft 5 with great difficulty because of the proximity of the rings to the shaft 5. However, the pressure of steam in the annular chamber 13 at a pressure greater than atmospheric pressure insures the exclusion of air from any point inside of the last few rings 10 of the outer group. Hence only steam can leak from the point of highest pressure, the annular chamber 13, into the turbine casing 6, where it is immediately drawn into the condenser. The quantity of steam which can leak past the inner rings 7 is, of course negligible, so that little steam is required for the packing. Under back pressure or atmospheric exhaust conditions the pressure of the steam within the turbine casing is greater than the pressure of the outside air, hence steam tends to work its way out of the casing along the shaft 5. The flow of the steam is impeded by the rings 7 as before and what little steam does leak past these rings is passed off to the atmosphere from the annular chamber 13. The outer group of rings 10 prevents leakage from this intermediate point. It is obvious that this packing is entirely independent of the movement or speed of the turbine shaft 5, and may therefore be used at any time or under any circumstances.

The operation of the liquid sealed section of the packing depends upon the rotation of the shaft 5 and the resulting centrifugal force imparted to the inclosed water by the impellers. Water or other sealing liquid is fed to the chamber 15 through the inlet port 19 at a constant pressure somewhat greater than that of the atmosphere. The impellers operate to maintain an annulus of sealing liquid within the casing of the impeller, which is capable of resisting the preponderating pressure of the atmosphere and of thereby preventing air from leaking into the working passages of the turbine and consequently into the condenser. While the pressure pumped by the impellers cannot exceed the pressure of the constant supply of liquid entering the port 19, the impellers overcome the tendency of the liquid to run into the exhaust passage of the turbine by maintaining an annulus within the impeller casing, in which the pressure is equal to the constant pressure of the liquid entering the port 19 and due to the head of that liquid plus atmospheric pressure. It will be apparent that the pressure pumped by each impeller will vary with the speed. For example, at high speeds the impeller 16 will be capable of maintaining a liquid pressure within the chamber 15 equal to the pressure of the liquid entering the chamber through the port 19, and the impeller will thereby be capable of maintaining an annulus of sealing liquid within the chamber 15 and around the outer edge of the impeller. Owing to the fact that this annulus is subjected to atmospheric pressure on one side of the impeller and to vacuum pressure on the other side of the impeller, the radial depth of the annulus will be considerably greater on the vacuum side of the impeller than on the atmospheric side. In this connection, attention is called to the fact that the atmospheric air is not subjected, in an appreciable degree, to centrifugal force and that consequently the operation of the impeller does not appreciably increase the pressure of the air acting on the atmospheric side of the annulus.

As the speed of the impeller decreases, the pressure pumped also decreases, thus permitting liquid to enter the chamber through the port 19. The additional liquid entering the chamber increases the radial depth of the annulus on both sides of the impeller, but the radial depth on the vacuum side of the impeller is increased considerably more than that on the atmospheric side, since centrifugal force on the vacuum side must counterbalance not only the static pressure of the atmospheric but also the static pressure of the column of liquid communicating with the port 19. From this it will be seen that for certain variations in speed the propeller 16 will be capable of maintaining a sealing annulus, but that for lower speeds the impeller acting alone will not be capable of maintaining the sealing annulus. Under lower speeds the pressure will decrease to such an extent that liquid, entering the port 19, will back up through the passage 18ª and thereby bring the impeller 17 into operation. This will cause the two impellers to operate in series and the combined centrifugal action occasioned by both impellers will then be sufficient to maintain an annulus capable of counterbalancing the static pressure of the head of water entering the port 19 and also the pressure of the atmosphere on the atmospheric side of the annulus.

In Fig. 2, I have shown a packing equipped with four runners for the purpose of describing more fully the operation of the runners under varying speeds of the shaft 5. It may be assumed that the static pressure of the liquid entering the port 19 is five pounds gage pressure, and that an absolute vacuum is maintained within the exhaust passage of the condenser. Bearing in mind that the gland is designed to seal against vacuum and that it is desirable to maintain this seal and to prevent the discharge of sealing liquid around the shaft on the atmospheric side of the gland, it will be apparent that the lowest speed at which the gland will operate and fulfil these conditions is a speed at which the sealing liquid will fill the impeller 16 to a point 22 on the atmospheric side of the gland. While operating at this speed and under the conditions assumed the centrifugal force action of the annulus or column of liquid from the point 22 to the periphery of the impeller will be five pounds and the columns or annuli of liquid located on opposite sides of the impeller 16 will just balance each other and the static head of the liquid entering the port 19. Hence the runner 16 is ineffective in packing against the atmospheric pressure and additional impellers are necessary to perform this function. Inasmuch as the annulus of liquid from the point 22 to the periphery of the impeller 16 occasions a centrifugal force action of five pounds, three such annuli, maintained under the same conditions and operating in series, will be necessary to effectively seal against atmospheric pressure, which is assumed to be fifteen pounds. Consequently, under the conditions assumed, liquid will enter the port 19 until the impellers 16, 17, 20 and 21 are completely filled and these impellers operating in series will seal the joint against atmospheric pressure on the one side and an absolute vacuum on the other. From the above it will be apparent that liquid automatically moves into or out of the additional impellers 17, 20 or 21 with variations in speed of the shaft 5 or differences in pressure between the inside and the outside of the turbine casing, and that the packing is always capable of keeping the joint effectively sealed except when the shaft 5 is at rest or is rotating at a lower speed than is commensurate with the number of impellers employed. It is evident that the number of impellers may be increased so as to maintain the liquid packing in operation under all speed conditions.

My improved liquid seal may be employed in connection with any kind of packing devices, on any kind of machines, or it may be employed alone. However, I have illustrated a preferred form which is especially adapted for steam turbines.

While I have illustrated and described but one embodiment of my invention, it will be apparent to those skilled in the art that various changes, modification, omissions and additions may be made in the apparatus illustrated without departing from the spirit and scope of my invention.

What I claim is:

1. A packing comprising two rotatable impellers, and a separate chamber in which each impeller operates in combination with a passage establishing communication between said chambers and extending from a point in one chamber adjacent the outer periphery of the inclosed impeller to a point in the other chamber adjacent the inner periphery of the inclosed impeller whereby the centrifugal action of one impeller augments the centrifugal action of the other.

2. A packing comprising two rotatable impellers, a separate chamber in which each impeller operates, a stationary partition between said chambers, in combination with a passage formed within said partition and extending from a point of high pressure in one chamber to a point of low pressure within the other chamber.

3. A packing for the joint between a rotatable shaft and a casing through which said shaft projects, comprising at least two impellers mounted on and rotatable with said shaft, a separate chamber in which each impeller operates, and a source of sealing liquid supply communicating with one chamber, in combination with a passage having stationary walls communicating with said last mentioned chamber at a point adjacent to the inner periphery of the inclosed impeller, and communicating with the other chamber at a point adjacent to the outer periphery of the inclosed impeller.

4. A packing for establishing a liquid seal between a rotatable shaft and a stationary casing through which said shaft projects, two impellers mounted on and rotatable with said shaft, a separate chamber inclosing each impeller, means for delivering a substantially constant supply of sealing liquid to the chamber located on the high pressure side of said packing and at a point adjacent to the outer periphery of the inclosed impeller, in combination with a passage having stationary walls and establishing communication between said chambers, said passage extending from a point near the inner periphery of the impeller of the chamber on the high pressure side of the packing to a point near the outer periphery of the impeller of the chamber on the low pressure side of the packing.

5. A packing for establishing a liquid seal between a rotatable shaft and a stationary member through which the shaft projects, comprising an impeller mounted on and rotatable with the shaft, a chamber inclosing the impeller, and means for delivering sealing liquid under pressure to said chamber at a point of high pressure within the chamber, in combination with a second impeller mounted on said shaft and located between the low pressure side of the packing and said first mentioned impeller, a second chamber inclosing said second impeller, and a passage establishing communication between said chambers and extending from a point of low pressure within the first chamber to a point of high pressure within the second chamber whereby the pumping action of the first impeller is augmented by the pumping action of the second impeller.

6. A packing for establishing a liquid seal between a rotatable shaft and a stationary member through which the shaft projects, comprising a rotatable impeller, a stationary casing surrounding said impeller and secured to said member and provided with an annular chamber in which said impeller operates, and means for delivering sealing liquid under pressure to said chamber at a point near its outer periphery, in combination with a second impeller mounted on said shaft and operating within a second annular chamber formed within said casing and located on the low pressure side of the packing with relation to said first mentioned chamber, a stationary partition separating the chambers, and a passage formed within said partition for establishing communication between the inner peripheral portion of the first mentioned chamber and the outer peripheral portion of the second mentioned chamber.

7. As a packing for sealing the joint between a rotatable member and a stationary member, a plurality of impellers, a casing inclosing the impellers, and division walls alternating with the impellers and provided with passages for connecting the inner portion of each impeller with the periphery of each adjacent impeller.

8. A packing gland for the joint between the rotor and stator of a turbine, comprising at least two impellers mounted on the rotor, a casing surrounding said impellers and provided with separate chambers in which the separate impellers operate, and a passage having stationary walls establishing communication between said chambers and extending from a point adjacent to the inner periphery of the impeller in one chamber to a point adjacent to the outer periphery of the impeller in the other chamber, in combination with a plurality of rings mounted on said casing and extending into close proximity to the rotor.

9. A packing gland for the joint between the rotor and stator of a turbine, comprising at least two impellers mounted on the rotor, a casing surrounding said impellers and provided with separate chambers in which the separate impellers operate, and a passage having stationary walls establishing communication between said chambers and extending from a point adjacent to the inner periphery of the impeller in one chamber to a point adjacent to the outer periphery of the impeller in the other chamber, in combination with a plurality of rings mounted on said casing and extending into close proximity to the rotor, and means for delivering motive fluid to or withdrawing fluid from an annular space formed within said casing and dividing said rings into two groups.

In testimony whereof I have hereunto subscribed my name this 20th day of February, 1917.

HENRY F. SCHMIDT.

Witnesses:
C. W. McGhee,
E. W. McCallister.